United States Patent [19]
Dittenhöfer

[11] Patent Number: 6,086,259
[45] Date of Patent: Jul. 11, 2000

[54] CHANGE BEARING FOR ROLLERS

[75] Inventor: Thomas Dittenhöfer, Riedbach, Germany

[73] Assignee: SKF GmbH, Schweinfurt, Germany

[21] Appl. No.: 09/241,403

[22] Filed: Feb. 2, 1999

[30] Foreign Application Priority Data

Feb. 3, 1998 [DE] Germany ........................ 298 01 746 U

[51] Int. Cl.[7] .................................................. F16C 19/36
[52] U.S. Cl. ......................... 384/450; 384/568; 384/585; 29/898.07
[58] Field of Search .................................. 384/450, 568, 384/584, 585, 537, 571; 29/898.07

[56] References Cited

U.S. PATENT DOCUMENTS

| | | | |
|---|---|---|---|
| 3,890,015 | 6/1975 | Harbottle | 384/571 |
| 4,054,999 | 10/1977 | Harbottle | 29/898.07 |
| 4,705,411 | 11/1987 | Kellstrom | 384/450 |
| 5,800,072 | 9/1998 | Buch et al. | 384/568 |

FOREIGN PATENT DOCUMENTS 295 16 107   1/1996   Germany .

Primary Examiner—Sherry L. Estremsky
Attorney, Agent, or Firm—Burns, Doane, Swecker & Mathis, L.L.P.

[57] ABSTRACT

A change bearing for rollers includes a mounting ring and a roller bearing set into the mounting ring. The mounting ring has a bore and an outside radial surface, and the roller bearing includes an inside ring, an outside ring and a plurality of cylinder-shaped pin rollers positioned between the inside ring and the outside ring. The pin rollers have a radius of curvature whose center is located diametrically across from the bearing axis. The inside ring is located at a predetermined position in relation to the outside radial surface of the mounting ring and the outside ring is positioned in the bore of the mounting ring at a position that is based on component tolerances and desired bearing play.

5 Claims, 1 Drawing Sheet

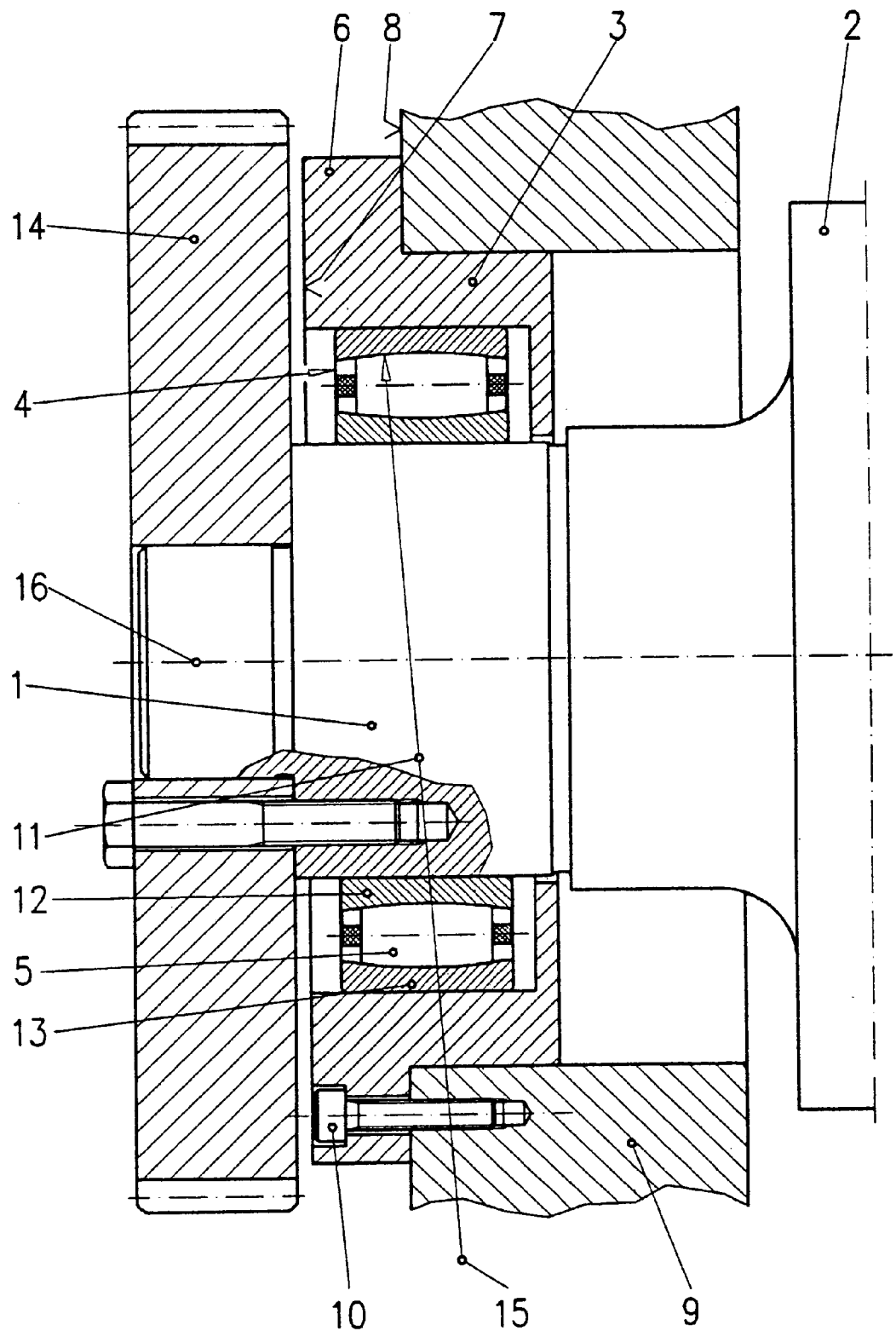

CHANGE BEARING FOR ROLLERS

This application corresponds to and claims priority under 35 U.S.C. § 119 with respect to German Application No. G 29801746.6 filed on Feb. 3, 1998, the entire content of which is incorporated herein by reference.

FIELD OF THE INVENTION

The present invention generally relates to roller bearings. More particularly, the present invention pertains to a change bearing for rollers.

BACKGROUND OF THE INVENTION

DE 295 16 107 U describes a change bearing that is able to accept axial forces and that is used for positioning rollers. The roller bearing is set into a mounting ring that is fixed to frame or housing parts. The mounting ring has a fixed, axial position in relation to the roller. Tolerances with respect to the components and a predetermined bearing play cause the axial position of the outside ring in the mounting ring to change from one position to another. This requires repeated positioning with complicated adjustment, particularly when changing the bearing.

In light of the foregoing, a need exists for a change bearing that permits cost-efficient positioning, and easy interchange.

SUMMARY OF THE INVENTION

The present invention provides a change bearing for rollers that includes a mounting ring and a roller bearing. The roller bearing has inside and outside rings between which are positioned pin rollers having a crowned surface possessing a large radius of curvature, with the center of the radius of curvature being located diametrically across from the bearing axis. The inside ring is located at a predetermined position in relation to the outside radial surface of the mounting ring and the outside ring is positioned in the bore of the mounting ring at a position that is based on component tolerances and desired bearing play.

The present invention creates a bearing unit that can be changed with minimal effort. The bearing unit can be simply pulled onto a certain, axial position on the journal. The axial position of the bearing unit, or in other words the amount by which the bearing unit should be pulled onto the journal, forms a part of the specifications of the bearing unit and can included by the bearing manufacturer in the installation instructions. The measuring value indicating the axial position of the bearing unit is preferably related to the outside radial surface of the flange of the mounting ring. This significantly reduces the effort when the change bearing according to the present invention is installed.

According to another aspect of the invention, a method of mounting a bearing on a journal to provide a desired play in the bearing involves positioning a bearing, which includes an inner ring and an outer ring, within a mounting ring which possesses an end surface so that a predetermined distance exists between an end face of the inner ring of the bearing and the end surface of the mounting ring, and pressing the outer ring of the bearing into the mounting ring to position the outer ring at a position which provides the desired play. The mounting ring is then mounted with the bearing onto a journal while maintaining the inner ring at the predetermine distance.

BRIEF DESCRIPTION OF THE DRAWING FIGURE

The foregoing and additional features and characteristics associated with the present invention will become more apparent from the following detailed description considered with reference to the accompanying drawing FIGURE which is a partial longitudinal cross-sectional view of a change bearing pulled onto the journal of a roller in accordance with the present invention.

DETAILED DESCRIPTION OF THE INVENTION

With reference to the drawing FIGURE, the change bearing according to the present invention is illustrated in partial cross-sectional view, and is shown as being pulled onto the journal 1 of a roller 2. A drive wheel 14 is illustrated as being connected to the journal 1 by way of one or more screws.

The change bearing includes a mounting ring 3 and a roller bearing 4 that is set into the mounting ring 3. The change bearing possesses a bearing axis 16. The roller bearing 4 is defined by an inside ring 12 and an outside ring 13, with a plurality of elongated barrel-shaped pin rollers 5 positioned between the inside ring 12 and the outside ring 13. Each of the pin rollers 5 possesses a crowned peripheral surface. The inside ring 12 has an outer surface corresponding in shape to the crowned outer surface of the pin rollers 5 and the outside ring 13 has an inner surface corresponding in shape to the crowned outer surface of the pin rollers 5.

One axial end of the mounting ring 3 is provided with a radially outwardly extending flange 6. One surface of the radially extending surfaces of the flange 6 (i.e., the right side radial surface) is fixed with screws 10 to the facing mounting surface 8 of a frame 9.

The pin rollers 5 are preferably three times as long as their widest diameter. The amount of crown of the outer surface of each respective pin roller 5 is such that the outer surface possesses a radius 11 which is far greater than the bearing diameter. The radius of curvature 11 of the crowned surface of the respective pin rollers 5 possesses a center 15 that is located diametrically across from the bearing axis 16. That is, the radius of curvature 11 of the crowned surface of the respective pin rollers 5 is so large compared to the diameter of the roller bearing that the center 15 of the radius curvature for the pin rollers 5 lies on the diametrically opposite side of the bearing axis 16 from the respective pin roller 5. This makes the roller bearing 4 especially well suited for play adjustment. By moving the inside ring 12 axially in relation to the outside ring 13, radial play and axial play can be set with precision.

The values indicating the amount of movement or the correct positioning of the inside ring 12 relative to the outside ring 13 to achieve the necessary or desired degree of radial and axial play are already set by the change bearing manufacturer prior to installation. For this purpose, a fixed axial position that is always the same in series, is set or assumed with reference to the mounting ring 3. The outer radial surface 7 of the radial flange 6 of the mounting ring 3 forms a reference basis for this purpose. The roller bearing 4 is pressed into the mounting ring 3 under these conditions, whereby the outer ring 13 takes different axial positions from one roller bearing to the next because of or depending upon the manufacturing tolerances of the components. When installed, though, the predetermined and desired bearing play is always the same from one roller bearing to the next.

During installation, the change bearing is pressed, taking into consideration its constant position in relation to the outside radial surface 7 of the flange 6, to such an extent axially via the inner ring 12 onto the journal 1 until the flange 6 comes to rest against the mounting surface 8 of the frame 9.

Thus, in accordance with the present invention, the adjustment of the play of the bearing 4 is effected before the bearing 4 is mounted on the journal 1. Further, the play adjustment is maintained when the bearing 4 is mounted on the journal 1. The play adjustment in the bearing 4 prior to mounting the bearing 4 on the journal 1 is achieved by positioning the bearing 4 in the mounting ring 6 so that the distance between the end surface 7 of the mounting ring 6 and the end surface of the inner ring 12 of the bearing 4 is always the same, independent of any tolerances in the dimensions of the various parts. To compensate for tolerances and to adjust the play in the bearing to a desired value, the outer ring 13 is pressed into the mounting ring 6 so that it is located at a position at which the play of the bearing exhibits the desired value.

As the outer ring 13 is pressed fitted into the mounting ring 6, no further measures are necessary to maintain the position of the outer ring 13. However, care must be taken to maintain the position of the inner ring 12 during mounting of the mounting ring 6, including the bearing 4, on the journal 1. Because the position of the inner ring 12 relative to the end surface 7 of the mounting ring 6 is always the same in accordance with the present invention, the position of the inner ring 12 during mounting onto the journal 1 can be accomplished in a relatively easy manner. For example, a specially formed tool could be used for pressing the bearing 4 in the mounting ring 6 onto the journal 1. This tool can possess a projection which accurately defines the dimension of the predetermined distance between the end surface of the inner ring 12 and the end surface 7 of the mounting ring 6. With such a tool, the inner ring 12 can be rather easily pressed fit onto the journal 1 while maintaining the relative positions between the end surface of the inner ring 12 and the end surface 7 of the mounting ring 6. As the outer ring 13 is fixed in the mounting ring 6, the relative positions between the inner ring 12 and the outer ring 13, and therefore the play of the bearing 4, would also be maintained.

By virtue of the present invention and the construction described above, a change bearing is provided that permits cost-efficient positioning of the roller bearing and easy interchange.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. Change bearing for rollers comprising one mounting ring and a roller bearing set into the mounting ring, said mounting ring having a bore and an outside radial surface, said roller bearing possessing a bearing axis and including an inside ring, an outside ring and a plurality of pin rollers positioned between the inside ring and the outside ring, the pin rollers possessing a crowned surface and having a radius of curvature whose center is located diametrically across from the bearing axis, the inside ring being located at a predetermined position in relation to the outside radial surface of the mounting ring, and the outside ring being positioned in the bore of the mounting ring at a position based on component tolerances and desired bearing play.

2. The change bearing according to claim 1, wherein the radius of curvature of the crowned surface of each pin roller is greater than the diameter of the roller bearing.

3. The change bearing according to claim 1, wherein the pin rollers possess a length and diameter, the length of the pin rollers being more than three times the diameter.

4. A method of mounting a bearing on a journal to provide a desired play in the bearing comprising:

positioning a bearing, which includes an inner ring and an outer ring, within a mounting ring which possesses an end surface so that a predetermined distance exists between an end face of the inner ring of the bearing and the end surface of the mounting ring;

pressing the outer ring of the bearing into the mounting ring to position the outer ring at a position which provides the desired play; and mounting the mounting ring with the bearing onto a journal while maintaining the inner ring at said predetermined distance.

5. The method according to claim 4, wherein the bearing includes a plurality of pin rollers having a crowned outer surface.

\* \* \* \* \*